(12) United States Patent
Morita et al.

(10) Patent No.: US 8,688,158 B2
(45) Date of Patent: Apr. 1, 2014

(54) RADIO RESOURCE CONTROL METHOD, RADIO STATION APPARATUS, RECORDING MEDIUM STORING RADIO STATION CONTROL PROGRAM, AND RADIO COMMUNICATION SYSTEM

(75) Inventors: Motoki Morita, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 637 days.

(21) Appl. No.: 12/920,282

(22) PCT Filed: Feb. 12, 2009

(86) PCT No.: PCT/JP2009/052343
§ 371 (c)(1),
(2), (4) Date: Aug. 30, 2010

(87) PCT Pub. No.: WO2009/119173
PCT Pub. Date: Oct. 1, 2009

(65) Prior Publication Data
US 2011/0009147 A1 Jan. 13, 2011

(30) Foreign Application Priority Data
Mar. 26, 2008 (JP) .................................. 2008-080741

(51) Int. Cl.
*H04B 7/00* (2006.01)

(52) U.S. Cl.
USPC ............ 455/509; 455/411; 455/436; 455/438

(58) Field of Classification Search
USPC ........................................................ 455/509
See application file for complete search history.

(56) References Cited

U.S. PATENT DOCUMENTS

| | | | |
|---|---|---|---|
| 2007/0097983 A1 | 5/2007 | Nylander et al. | |
| 2008/0293382 A1* | 11/2008 | Lubenski et al. | 455/411 |
| 2008/0305801 A1* | 12/2008 | Burgess et al. | 455/444 |
| 2009/0129263 A1* | 5/2009 | Osborn | 370/230 |
| 2009/0196266 A1* | 8/2009 | Wu et al. | 370/338 |

FOREIGN PATENT DOCUMENTS

| | | |
|---|---|---|
| CN | 1602110 A | 3/2005 |
| GB | 2 428 937 A | 2/2007 |
| JP | 2001-245353 A | 9/2001 |
| JP | 2003-283656 A | 10/2003 |
| WO | 2007/040449 A1 | 4/2007 |
| WO | 2007040452 A1 | 4/2007 |

OTHER PUBLICATIONS

Office Action dated Dec. 25, 2012, issued by the State Intellectual Property Office of the People's Republic of China in counterpart Chinese Application No. 200980107179.8.
Office Action, dated Apr. 18, 2013, issued by the State Intellectual Property Office of P.R. China in counterpart Chinese Patent Application No. 200980107179.8.

\* cited by examiner

*Primary Examiner* — Ajibola Akinyemi
(74) *Attorney, Agent, or Firm* — Sughrue Mion, PLLC

(57) ABSTRACT

To effectively suppress interference on other radio stations located in the vicinity, when the radio station performs radio communication with a registered radio station. A femto base station 1 stores a history of connection requests issued by an unregistered radio station that is not pre-registered in the femto base station 1. Then, the femto base station 1 determines the need of a adjustment of a radio resource used in communication with a registered radio station that is pre-registered in the femto base station 1 itself by using connection request frequencies each for one of unregistered radio stations obtained from the connection request history as an index.

29 Claims, 8 Drawing Sheets

| | | TOTAL FREQUENCY FT OF CONNECTION REQUESTS BY ALL UNREGISTERED MOBILE STATIONS | |
|---|---|---|---|
| | | FT < Th3 | FT >= Th3 |
| CONNECTION REQUEST FREQUENCY F1 FOR EACH UNREGISTERED MOBILE STATION | F1 < Th1 | • MAINTAIN MAXIMUM VALUE OF TRANSMISSION POWER AT P1<br>• RECOVER GRADUALLY WHEN MAXIMUM VALUE OF TRANSMISSION POWER IS LOWERED | LOWER MAXIMUM VALUE OF TRANSMISSION POWER TO P2 |
| | F1 >= Th1 | LOWER MAXIMUM VALUE OF TRANSMISSION POWER TO P2 | CHANGE USED FREQUENCY BAND |

Fig. 6

RADIO RESOURCE CONTROL METHOD, RADIO STATION APPARATUS, RECORDING MEDIUM STORING RADIO STATION CONTROL PROGRAM, AND RADIO COMMUNICATION SYSTEM

TECHNICAL FIELD

The present invention relates to a radio resource control technique used in communication between radio stations.

BACKGROUND ART

In recent years, as the demand for indoor voice communication and data communication has grown due to the spread of mobile phones, the development of a home-use base station that can be installed inside a building such as a user's house and a small-scale office has been pursued. Since an area covered by the base station that can be installed indoors is considerably smaller than that of an existing base station installed outdoor, the area is called "femtocell". Hereinafter, a base station forming a femtocell is called "femto base station". As a method of operation of femto base stations, a way of implementing communication in which only a pre-registered mobile station(s) is connected to a femto base station has been studied.

Femto base stations as well as base stations in existing mobile communication networks transmit a common pilot signal. A mobile station performs synchronization establishment, channel estimation, and the like by receiving a common pilot signal, and thereby performs data transmission/reception with a base station. Therefore, it is necessary to be able to receive a common pilot signal with good receiving quality in a mobile station in order to provide good communication quality.

In base stations in existing mobile communication networks, the transmission power of a common pilot signal to be transmitted in each cell is set to a fixed value. In contrast to this, as for common pilot signals transmitted by femto base stations in femtocells, a way of autonomously setting the transmission power by a femto base station has been studied. Patent document 1 (page 14, line 8 to page 15, line 21) discloses such a method.

A specific example of a transmission power setting method for a femto base station disclosed in Patent document 1 is explained hereinafter with reference to FIG. 8. In FIG. 8, a macro base station 811 forms a macrocell 801 and transmits a common pilot signal CP1 with a constant transmission power to communicate with a mobile station (not shown). Femto base stations 812A and 812B form femtocells 802A and 802B respectively to communicate with a mobile station(s) (not shown). Further, each of the femto base stations 812A and 812B measures a received power Pmacro [dBm] of the common pilot signal CP1 of the macro base station 811, and they transmit common pilot signals CP2A and CP2B respectively with a transmission power Pmacro+ Poffset [dBm] by using the same radio frequency band as that of the macro base station 811. Note that Poffset is a constant value common to all the femtocells 802A and 802B.

The femto base station like the one described above has been studied for use in systems such as W-CDMA (Wideband Code Division Multiple Access) and E-UTRAN (also called "LTE: Long Term Evolution"). In W-CDMA, data transmission is performed by using a dedicated channel, of which transmission power is controlled, on the uplink and the downlink, or is performed by using a shared channel on the downlink as described in 3GPP TS 25.214 V7.3.0. Further, in E-UTRAN, a radio frequency band is divided into a plurality of PRBs (Physical Resource Blocks) as described in 3GPP TS 36.300 V8.1.0. Specifically, a scheduler provided in an E-UT-RAN base station assigns PRBs, and a base station performs data transmission with a mobile station by using an assigned PRB.

[Patent Document 1]
UK Patent Application Publication No. 2428937 A

DISCLOSURE OF INVENTION

Technical Problem

Assume a case where each of the femto base stations 812A and 812B shown in FIG. 8 is located in a different room separated by a wall 901 within a building 90 as shown in FIG. 9. In FIG. 9, a mobile station 91A, which is a mobile station registered in a femto base station 812A, can connect to and communicate with the femto base station 812A. However, the mobile station 91A is not registered in a femto base station 812B, and therefore cannot connect to and communicate with the femto base station 812B. Meanwhile, a mobile station 91B, which is a mobile station registered in the femto base station 812B, can connect to and communicate with the femto base station 812B. The mobile station 91B is not registered in the femto base station 812A, and therefore cannot connect to and communicate with the femto base station 812A.

When these two femto base stations 812A and 812B are located adjacent to each other and each of these two base stations communicates with a mobile station by using the same frequency band, the interference problem becomes prominent as described below. That is, as shown in FIG. 9, when the femto base station 812B is located near the wall 901 and the mobile station 91A is also located near the wall 901 at the same time, the downlink signal transmitted by the femto base station 812B could interfere with the downlink signal that the mobile station 91A receives from the femto base station 812A. As a result, there is a possibility that the downlink signal that the mobile station 91A receives from the femto base station 812A could deteriorate in quality. On the other hand, the uplink signal transmitted by the mobile station 91A could interfere with the uplink signal that the femto base station 812B receives from the mobile station 91B. As a result, there is a possibility that the uplink signal that the femto base station 812B receives from the mobile station 91B could deteriorate in quality.

Note that the occurrence of the above-described interference problem is not limited to the cases where a femto base station is used. For example, it could be also problematic in radio ad-hoc networks in which radio stations autonomously form a network. That is, the above-described interference problem could commonly occur when a second radio station communicates with a second registered radio station that is permitted to connect to the second radio station in the vicinity of where a first radio station is already performing communication with a first registered radio station that is permitted to connect to the first radio station.

The present invention has been made based on the above-described findings, and an object of the present invention is to provide a radio resource control method that, when a radio station performs radio communication with a registered radio station, can effectively suppress interference on another radio station(s) located in the vicinity, a radio station apparatus, a radio station control program, and a radio communication system.

Technical Solution

A first aspect of the present invention includes a radio resource control method for a first radio station. The method includes following steps (a) and (b). The step (a) includes recording a history of a connection request issued from a plurality of second radio stations to a first radio station. The step (b) includes determining execution of an adjustment of a radio resource used in communication between at least one of the plurality of second radio stations and the first radio station by using connection request frequencies each for one of unregistered radio stations as an index, the unregistered radio stations being radio stations that are not pre-registered in the first radio station among the plurality of second radio stations.

Further, a second aspect of the present invention includes a radio station apparatus. The radio station apparatus includes a radio transmission/reception unit and a radio resource adjustment unit. The radio resource adjustment unit adjusts, bases on a history of a connection request issued by a plurality of opposed radio stations, a radio resource used in communication with at least one of the plurality of opposed radio stations through the radio transmission/reception unit by using connection request frequencies each for one of unregistered radio stations as an index, the unregistered radio stations being radio stations that are not pre-registered among the plurality of opposed radio stations. In a case of a femto base station 1 in accordance with a first exemplary embodiment of the invention described later, for example, a radio network control unit 15 corresponds to the radio resource adjustment unit.

Further, a third aspect of the present invention includes a recording medium storing a radio station control program to cause a computer to execute control processing relating to a radio station apparatus. The control processing includes a process (a) of recording a history of a connection request issued from a plurality of opposed radio stations to the radio station apparatus, and a process (b) of determining execution of an adjustment of a radio resource used in communication between at least one of the plurality of opposed radio stations and the radio station apparatus by using connection request frequencies each for one of unregistered radio stations as an index, the unregistered radio stations being radio stations that are not pre-registered in the radio station apparatus among the plurality of opposed radio stations.

Further, a radio communication system in accordance with a fourth aspect of the present invention includes a first radio station and a radio resource adjustment unit. The first radio station includes a radio transmission/reception unit capable of transmitting/receiving a radio signal. The radio resource adjustment unit adjusts, bases on a history of a connection request arrived from the plurality of second radio stations to the radio transmission/reception unit, a radio resource used in communication between at least one of the plurality of second radio stations and the radio transmission/reception unit by using connection request frequencies each for one of the unregistered radio stations as an index, the unregistered radio stations being radio stations that are not pre-registered among the plurality of second radio stations. Note that the radio resource adjustment unit provided in the radio communication system in accordance with this aspect may be disposed inside the first radio station, or disposed in a network to which the first radio station is connected in a communicable manner.

Advantageous Effects

For example, a large value of the connection request frequency by an unregistered radio station that is not pre-registered in the radio station apparatus in accordance with the above-described second aspect of the present invention indicates that the unregistered radio station frequently exists in the vicinity of the radio station apparatus. Therefore, the magnitude of the connection request frequency by an unregistered radio station can be used as an index that indirectly indicates the degree of interference between a signal transmitted/received by the unregistered radio station and a signal transmitted/received by the radio station apparatus.

In the first to fourth aspects of the present invention in which attention is focused on this feature, the radio resource is adjusted by using a connection request frequency by an unregistered radio station as an index. Therefore, the radio resource can be adjusted so that interference with an external radio signal that is transmitted/received between an unregistered radio station and another radio station(s) is suppressed according to the connection request frequency by the unregistered radio station. That is, in accordance with first to fourth aspects of the present invention, the occurrence of interference with a radio signal that is transmitted/received by an unregistered radio station can be estimated by using an index that is relatively easily measured, i.e., by using a connection request frequency by the unregistered radio station, and therefore the interference can be effectively suppressed.

BRIEF DESCRIPTION OF DRAWINGS

FIG. 6 is a table showing detail of a radio resource adjustment procedure performed by a femto base station in accordance with a second exemplary embodiment of the present invention;

EXPLANATION OF REFERENCE

1, 6 FEMTO BASE STATION
2 FEMTOCELL
3-1 MOBILE STATION (REGISTERED MOBILE STATION)
3-2 MOBILE STATION (UNREGISTERED MOBILE STATION)
4 FEMTO GATEWAY APPARATUS
5 NETWORK
10 ANTENNA
11 RADIO TRANSMISSION/RECEPTION UNIT
12 RECEPTION DATA PROCESSING UNIT
13 TRANSMISSION DATA PROCESSING UNIT
14 WIRED TRANSMISSION/RECEPTION UNIT
15 RADIO NETWORK CONTROL UNIT
16 MOBILE STATION MODE RECEPTION UNIT
17 RADIO NETWORK CONTROL DATA SETTING UNIT

18 CONNECTION CONTROL UNIT
19 CONNECTION REQUEST HISTORY STORAGE UNIT
61 RADIO RESOURCE ADJUSTMENT UNIT

BEST MODE FOR CARRYING OUT THE INVENTION

Specific exemplary embodiments to which the present invention is applied are explained hereinafter in detail with reference to the drawings. The same components are denoted by the same signs throughout the drawings, and duplicated explanation is omitted as appropriate for simplifying the explanation.

First Exemplary Embodiment of the Invention

Figure 1:
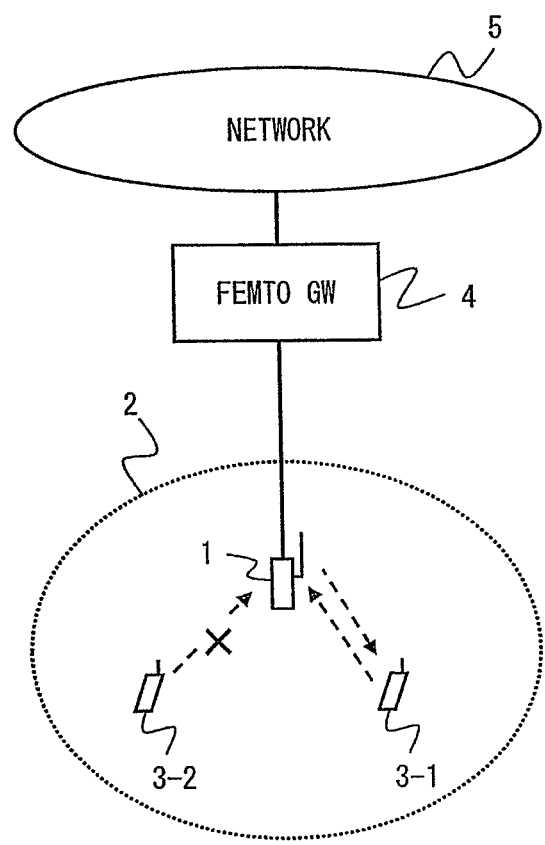
FIG. 1 is a configuration diagram of a radio communication system including a femto base station in accordance with a first exemplary embodiment of the present invention.

FIG. 1 shows a configuration example of a radio communication system including a femto base station 1 in accordance with this exemplary embodiment. The following explanation is made on the assumption that the radio communication system in accordance with this exemplary embodiment is a radio communication system adopting an FDD (Frequency division Dupulex)-CDMA mode, more specifically a W-CDMA mode.

In FIG. 1, the femto base station 1 forms a femtocell 2. Further, the femto base station 1 has a function of restricting mobile stations that can connect to the femto base station 1 itself. A mobile station 3-1 connects to and communicates with the femto base station 1 in the femtocell 2. That is, the mobile station 3-1 is a mobile station that is permitted to connect to the femto base station 1. Mobile stations that are permitted to connect to the femto base station 1 including the mobile station 3-1 are hereinafter called "registered mobile stations". Meanwhile, a mobile station 3-2 is not permitted to connect to the femto base station 1. Therefore, even if the mobile station 3-2 issues a connection request to the femto base station 1, the connection is refused. Mobile stations that are not permitted to connect to the femto base station 1 including the mobile station 3-2 are hereinafter called "unregistered mobile stations".

A femto gateway apparatus 4 is connected to the femto base station 1. Further, the femto gateway apparatus 4, which is also connected to an upper network 5, controls communication and performs information transmission between the network 5 and the mobile station 3 located within the subordinate femtocell 2 formed by the femto base station 1.

Furthermore, the femto base station 1 in accordance with this exemplary embodiment is configured such that when the femto base station 1 receives a connection request from an unregistered mobile station and refuses that connection request, the femto base station 1 stores a history of the connection request by the unregistered mobile station. The femto base station 1 calculates the frequency of connection requests (hereinafter, called "connection request frequency") by the unregistered mobile station by referring to the connection request history, and determines the need of a radio resource adjustment by using the connection request frequency by the unregistered mobile station as an index. Note that the radio resource is a radio resource used between the femto base station 1 and a registered mobile station. Then, when it is determined that the radio resource adjustment is necessary, the femto base station 1 adjusts the radio resource so that the interference with an external radio signal transmitted/received between the unregistered mobile station and another radio station (e.g., another femto base station or a macro base station forming a macrocell in a higher layer) is suppressed. Specific examples of the radio resource to be adjusted include the maximum value of the total transmission power of all the downlink channels transmitted by the femto base station 1 within the femtocell 2 and a used frequency band.

Note that, needless to say, FIG. 1 shows only a few components for the sake of explanation. That is, the radio communication system in accordance with this exemplary embodiment may include other femto base stations and mobile stations in addition to those shown in FIG. 1, and may also include a macrocell in a higher layer that is formed so as to cover the femtocell 2 and a macro base station forming this macrocell.

Figure 2:
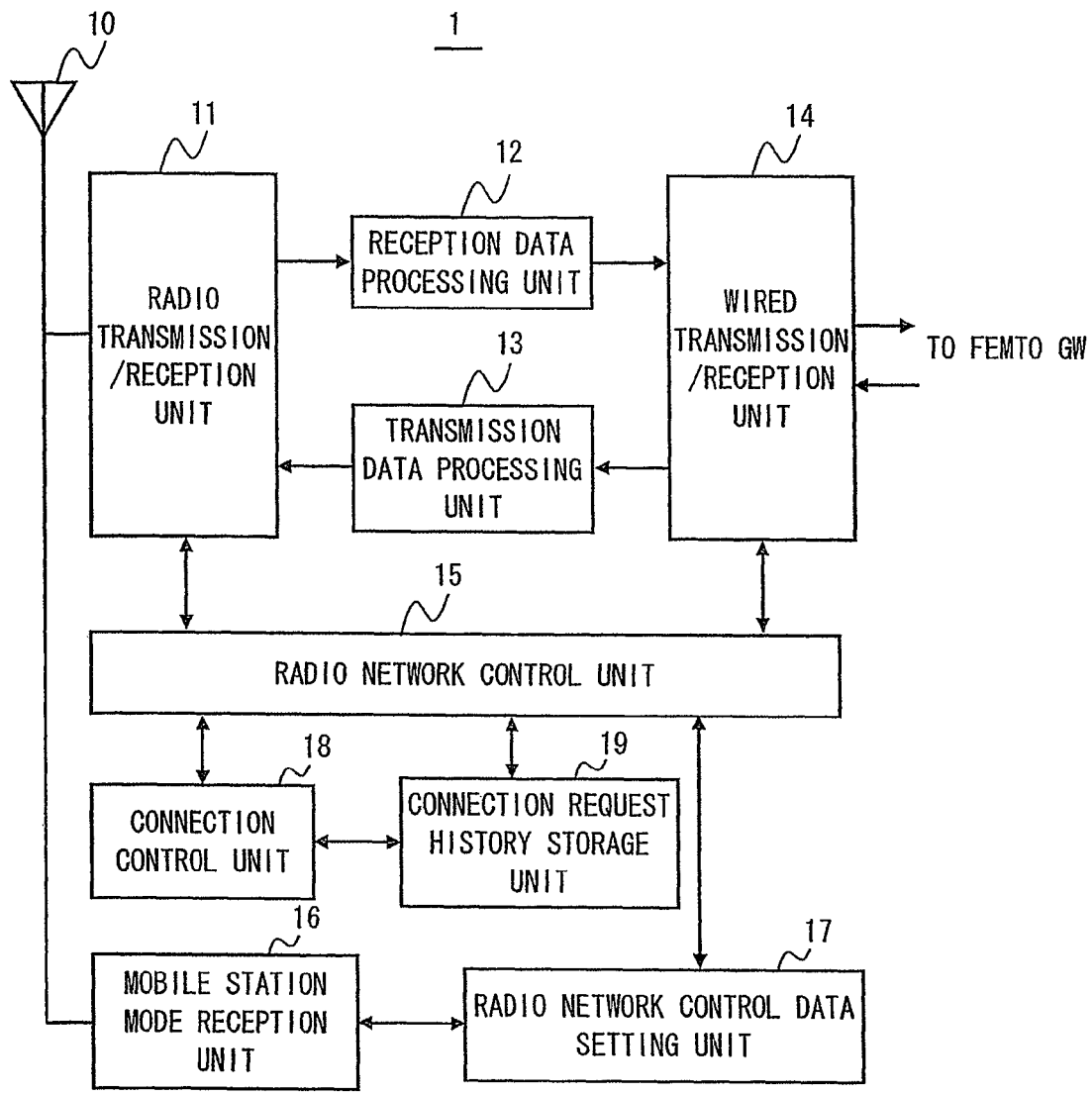
FIG. 2 is a block diagram of a femto base station in accordance with a first exemplary embodiment of the present invention.

A configuration example of the femto base station 1 and a specific example of a radio resource adjustment operation are explained hereinafter in detail. FIG. 2 is a block diagram showing a configuration of the femto base station 1.

A radio transmission/reception unit 11 receives an uplink signal transmitted from a mobile station through an antenna 10, and outputs a downlink signal to be transmitted to a mobile station to the antenna 10. The radio parameter relating to the radio resource that is used when the radio transmission/reception unit 11 transmits/receives a radio signal is designated by a radio network control unit 15, which is described later. Specific examples of the radio parameter designated by the radio network control unit 15 include a used frequency band, a transmission power Ptx of a common pilot signal CPICH, a maximum value Ptx_total_max of the total transmission power of all the downlink channels, and a target value RTWP_target of the total received power (Received Total Wideband Power) in the uplink data transmission from the mobile station.

A reception data processing unit 12 performs demodulation processing on an uplink channel signal received by the radio transmission/reception unit 11, and supplies the obtained uplink data to a wired transmission/reception unit 14. A transmission data processing unit 13 receives downlink data to be transmitted to the mobile station from the wired transmission/reception unit 14, performs processing including error correction encoding and interleaving, and then supplies the processed downlink data to the radio transmission/reception unit 11.

The wired transmission/reception unit 14 functions as an interface that transmits/receives uplink/downlink data to/from the femto gateway apparatus 4.

The radio network control unit 15, which has a function as a radio network controller (RNC), supplies radio parameters such as a used frequency band, a transmission power of a common pilot signal CPICH, and a maximum value of the total transmission power of all the downlink channels to the radio transmission/reception unit 11. Note that in the configuration example shown in FIG. 2, the transmission power of a common pilot signal CPICH is determined by a radio network control data setting unit 17, which is described later. Further, the radio network control unit 15 adjusts a maximum value Ptx_total_max of the total transmission power of all the downlink channels by using a history of connection requests by an unregistered mobile station(s) accumulated in a connection request history storage unit 19. A specific example of an adjustment procedure of Ptx_total_max by using a history of connection requests by an unregistered mobile station is explained later.

A mobile station mode reception unit 16 measures a received power Pmacro of a common pilot signal that is transmitted from a macro base station (not shown) forming a macrocell (not shown) overlaid over the femtocell 2 through the antenna 10.

The radio network control data setting unit 17 receives a notification of Pmacro measured by the mobile station mode reception unit 16, determines a transmission power Ptx of a common pilot signal by the femto base station 1, and sends them to the radio network control unit 15. Note that a technique to determine the transmission power Ptx of a common pilot signal according to the received power Pmacro of a common pilot signal transmitted from a macro base station (not shown) is described in Patent document 1 and Japanese Patent Application No. 2007-263050 (filed Oct. 9, 2007), which was previously filed by the applicant of the present application. Therefore, detailed explanation of the technique to determine the transmission power Ptx of a common pilot signal is omitted in this application.

Note that each of the above-described mobile station mode reception unit 16 and the radio network control data setting unit 17 are not an indispensable component to carry out the present invention. As described above, the mobile station mode reception unit 16 and the radio network control data setting unit 17 are provided to determine the transmission power Ptx of a common pilot signal of the femto base station 1 according to the received power Pmacro of a common pilot signal transmitted by a macro base station (not shown) Therefore, if the femto base station 1 does not need to perform the autonomous setting operation for the transmission power of a common pilot signal like this, the mobile station mode reception unit 16 and the radio network control data setting unit 17 may be omitted.

A connection control unit 18 receives a connection request that is transmitted from a mobile station to the femto base station 1 through the antenna 10, the radio transmission/reception unit 11, the reception data processing unit 12, the wired transmission/reception unit 14, and the radio network control unit 15. Note that specific examples of the connection request transmitted from a mobile station include a call-in from a mobile station, a reception of a position registration request that is transmitted from a mobile station as a cell selection operation is performed upon power-up of the mobile station, and a reception of a position registration request that is transmitted from a mobile station as a cell re-selection operation is performed upon change of the cell within which the mobile station is located. The connection control unit 18 determines the permission/refusal of connection to the femto base station 1 based on whether the mobile station that has transmitted the connection request is a registered mobile station or not. For example, the connection control unit 18 may hold a permission list on which mobile-station IDs of the registered mobile stations are recorded (not shown), and thereby determine the permission/refusal of connection by comparing a mobile-station ID contained in the connection request received from the mobile station with the permission list.

When the above-described connection control unit 18 refuses a connection request by an unregistered mobile station, the connection control unit 18 accumulates its history in the connection request history storage unit 19. Specifically, time information indicating the date and time at which the connection request by the unregistered mobile station is received, the mobile-station ID of the request source, and the like may be stored in the connection request history storage unit 19. Note that, needless to say, the connection control unit 18 may also store a history of connection requests for which the connection is permitted in addition to the history of connection requests for which the connection is refused in the connection request history storage unit 19.

Figure 3:
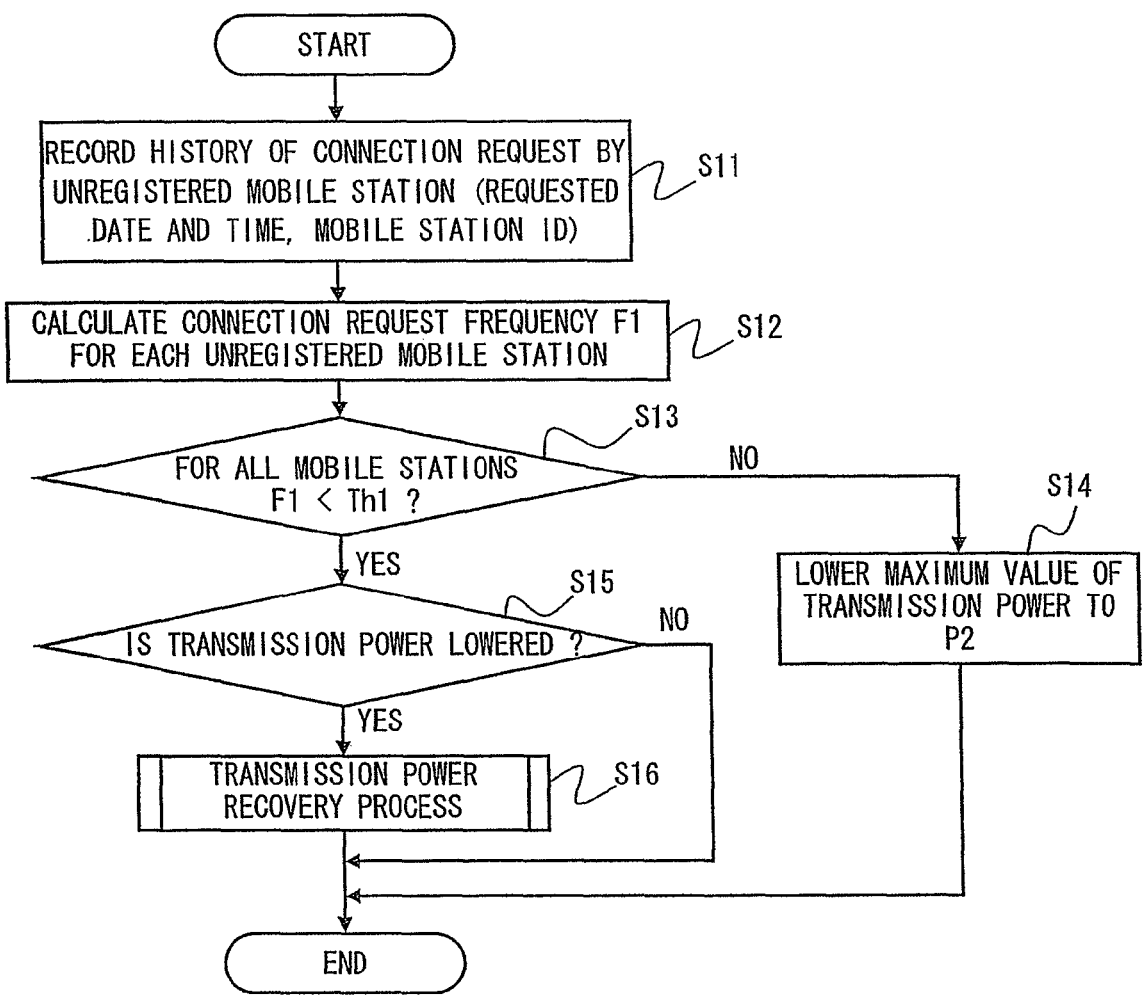
FIG. 3 is a flowchart showing a radio resource adjustment procedure performed by a femto base station in accordance with a first exemplary embodiment of the present invention.
Figure 4:
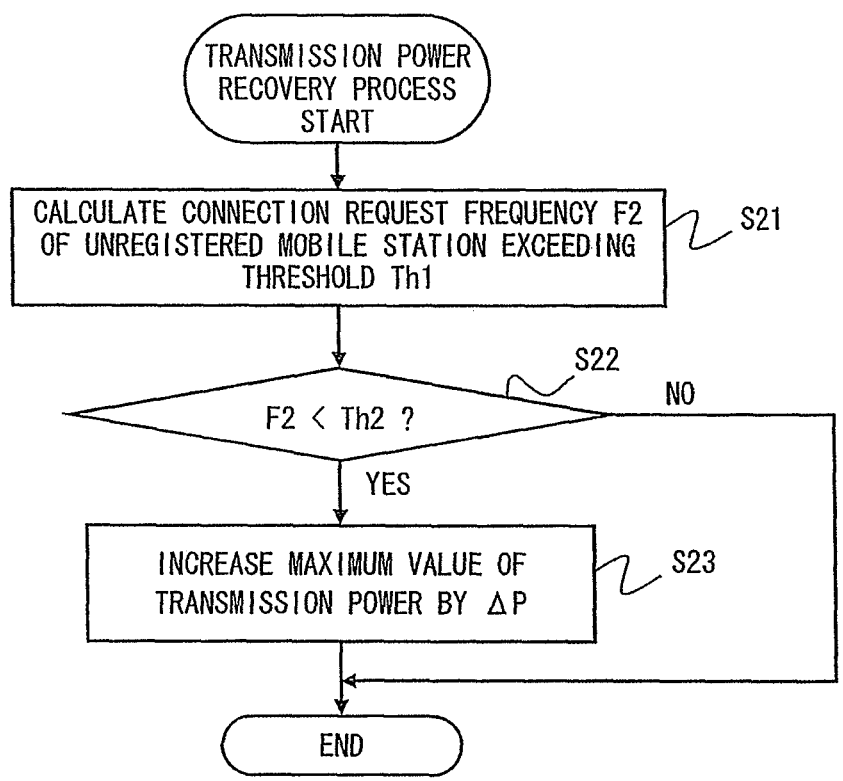
FIG. 4 is a flowchart showing a radio resource adjustment procedure performed by a femto base station in accordance with a first exemplary embodiment of the present invention.

Next, a procedure to adjust the total downlink transmission power Ptx_total_max by using a history of connection requests by an unregistered mobile station is explained hereinafter with reference to FIGS. 3 and 4. FIGS. 3 and 4 are flowcharts showing a specific example of an adjustment procedure of a total downlink transmission power Ptx_total_max.

In a step S11 of FIG. 3, the connection control unit 18 records a history of connection requests by an unregistered mobile station(s) (date and time of connection request, and mobile-station ID) in the connection request history storage unit 19.

In a step S12, the radio network control unit 15 calculates connection request frequencies F1 each for a respective one of unregistered mobile stations that are identified by mobile-station IDs. Note that the period over which the history of connection requests is summarized to calculate the connection request frequency F1 may be determined, for example, in the following manner. That is, unregistered mobile stations such as the mobile station 3-2 are configured such that they do not perform transmission of a new connection request to a base station from which connection is refused for a predetermined prohibition period. Then, the period over which the history of connection requests is summarized to calculate the connection request frequency F1 may be set so as to be longer than this prohibition period. By setting the period in this manner, such a situation that an unregistered mobile station(s) successively and frequently transmits connection requests can be avoided. Further, an appropriate summarizing period of a history, which may correspond to a period within which two or more connection requests can be issued, can be set in the femto base station 1.

In a step S13, the radio network control unit 15 determines whether all the connection request frequencies F1 each for a respective one of the unregistered mobile stations are lower than a threshold Th1 or not. In this determination, when the connection request frequency F1 of at least one of the unregistered mobile stations is equal to or greater than the threshold Th1 (No in step S13), the radio network control unit 15 lowers the maximum value Ptx_total_max of the total transmission power of all the downlink channels from a value P1 that is used in the normal operation to a value P2 (step S14).

On the other hand, when all the connection request frequency F1 each for one of the unregistered mobile stations are lower than the threshold Th1 (Yes in step S13), the process proceeds to a determination process in a step S15. In a step S15, the radio network control unit 15 determines whether or not the maximum value Ptx_total_max of the total transmission power has been lowered from the value P1 used in the normal operation as a result of a determination process performed in the past. When the maximum value Ptx_total_max of the total transmission power is in a lowered state (Yes in step S15), the radio network control unit 15 performs a transmission power recovery process (step S16).

A specific example of the transmission power recovery process performed in the step S16 is explained with reference to a flowchart shown in FIG. 4. In a step S21, a connection request frequency(s) F2 of an unregistered mobile station(s) whose connection request frequency F1 exceeded the threshold Th1 thereby causing the decrease in the maximum value Ptx_total_max of the total transmission power is summarized. Note that instead of calculating the frequency F2 again, the frequency F1 that was calculated in the step S12 of FIG. 3 may be reused for the unregistered mobile station that has caused the decrease in Ptx_total_max.

In a step S22, whether the connection request frequency F2 is lower than a threshold Th2 or not is determined. Note that if the recovery of Ptx_total_max needs to be performed cautiously, the threshold Th2 should be set to a smaller value in comparison to the above-described threshold Th1.

When the connection request frequency F2 is lower than the threshold Th2 (Yes in step S22), the process proceeds to a step S23. In the step S23, the maximum value Ptx_total_max of the total transmission power is increased by ΔP. The value ΔP is a step size used to recover Ptx_total_max. Therefore, if the recovery of Ptx_total_max needs to be performed cautiously, it should be set to a relatively small value, whereas if the recovery of Ptx_total_max needs to be performed swiftly, it should be set to a relatively large value.

Further, ΔP does not necessarily need to be a constant value over the entire period of the Ptx_total_max recovery process. That is, it may be gradually increased or gradually decreased. Furthermore, ΔP may be changed according to the magnitude of the connection request frequency F2. Specifically, ΔP may be increased as the connection request frequency F2 decreases. In this way, in a situation where the connection request frequency F2 is small and the probability that an unregistered mobile station exists in the vicinity is thereby presumed to be low, the maximum value Ptx_total_max of the total transmission power can be swiftly recovered. On the other hand, in a situation where the connection request frequency F2 is large and the probability that an unregistered mobile station exists in the vicinity is thereby presumed to be high, the recovery speed of the maximum value Ptx_total_max of the total transmission power can be made slower.

Figure 5:
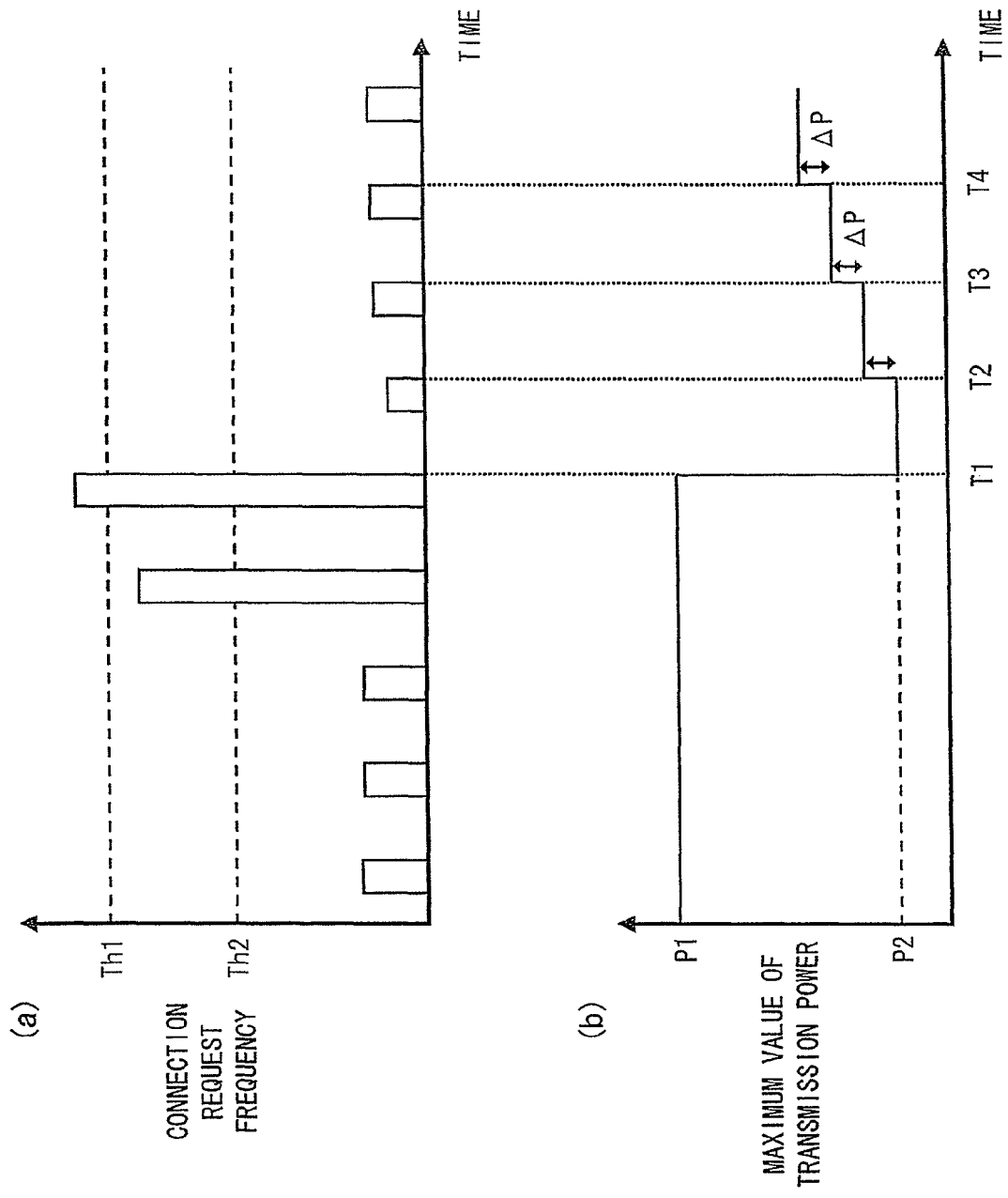
FIG. 5 is a graph for explaining a radio resource adjustment procedure performed by a femto base station in accordance with a first exemplary embodiment of the present invention.

The radio network control unit 15 may perform the adjustment procedure shown in FIGS. 3 and 4 at regular intervals. FIG. 5(a) is a graph showing a connection request frequency F1 of a certain unregistered mobile station along a time series. Meanwhile, FIG. 5(b) is a graph showing the maximum value Ptx_total_max of the total transmission power that is adjusted by performing the procedure shown in FIGS. 3 and 4 at regular intervals.

At a time T1 in FIGS. 5(a) and 5(b), since the connection request frequency F1 exceeds the threshold Th1, the maximum value Ptx_total_max of the total transmission power is lowered from P1 to P2. At times T2, T3 and T4 subsequent to the time T1, since the connection request frequency F1 is lower than the threshold Th2, the maximum value Ptx_total_max of the total transmission power is successively increased by ΔP.

Figure 9:
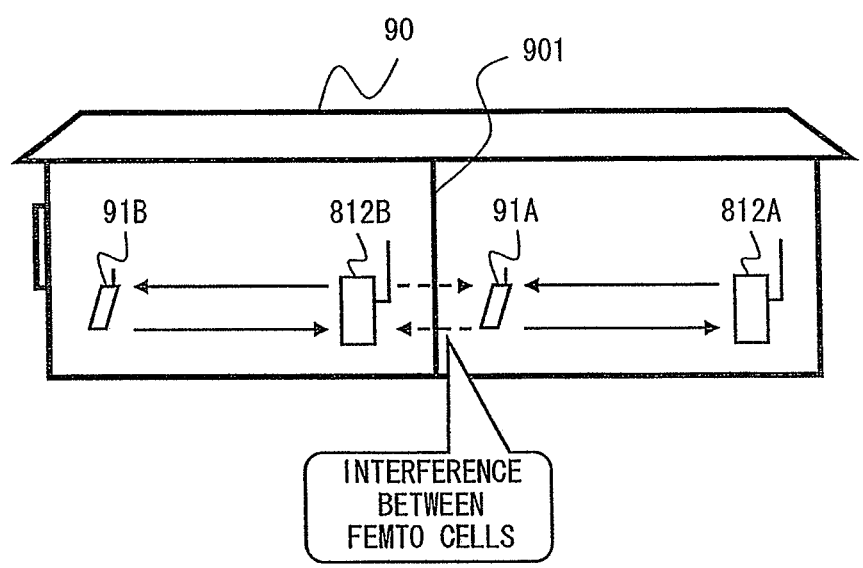
FIG. 9 shows an arrangement of a base station for explaining a problem to be solved.

As described above, the femto base station 1 in accordance with this exemplary embodiment adjusts a radio resource by using the frequency of connection requests by an unregistered mobile station as an index. A large value of the connection request frequency by an unregistered radio station indicates that the unregistered mobile station frequently exists in the vicinity of the femto base station 1. Therefore, the magnitude of the connection request frequency by an unregistered radio station can be used as an index that indicates the degree of interference occurrences between a signal transmitted/received by the femto base station 1 and a signal transmitted/received by the unregistered mobile station. That is, the femto base station 1 can surmises that the femto base station 1 is located in a situation where interference between a transmission/reception signal of an unregistered mobile station and a transmission/reception signal of the femto base station 1 itself occurs frequently as shown in FIG. 9 by using an index that can be easily measured, i.e., the connection request frequency by the unregistered mobile station.

Further, when the frequency of connection requests by an unregistered mobile station increases on condition that the frequency of connection requests is used as an index, the femto base station 1 lowers the maximum value Ptx_total_max of the total transmission power. In this way, the femto base station 1 can effectively suppress the occurrence of interference between a signal transmitted/received between an unregistered mobile station and another radio station (e.g., another femto base station or a macro base station forming an upper macrocell) and a transmission/reception signal of the femto base station 1 itself.

Note that, needless to say, the adjustment procedure of the maximum value Ptx_total_max of the total transmission power shown in FIGS. 3 and 4 is merely an example. For example, when Ptx_total_max is to be lowered, the adjustment may be performed in such a manner that the connection request frequency by an unregistered mobile station is compared with multi-step thresholds so that Ptx_total_max is gradually decreased as the connection request frequency by the unregistered mobile station increases.

Further, an example where the maximum value Ptx_total_max of the total transmission power is lowered by using the connection request frequency by an unregistered mobile station as an index is explained in the above explanation. However, lowering the maximum value Ptx_total_max of the total transmission power is merely an example of the radio resource adjustment performed to avoid the interference. That is, the parameter relating to the radio resource that is adjusted based on the connection request frequency by an unregistered mobile station may be any parameter that enables, by changing it, the interference with a signal transmitted/received by a radio station located in the vicinity to be suppressed. For example, when the occurrence of interference is predicted based on the connection request frequency by an unregistered mobile station, the femto base station 1 may change the frequency band used in radio communication with a registered mobile station.

Further, the radio resource adjustment procedure shown in FIGS. 3 and 4 can be also performed by causing a computer such as a microprocessor to execute a program for base-station control. Specifically, it may be performed by causing a computer running a base-station control program to execute referring to a connection request history, calculating a connection request frequency, and controlling increase/decrease of the maximum value Ptx_total_max of the total transmission power.

Further, the program can be stored in various types of storage media, or can be transmitted through a communication medium. Example of the storage media include flexible discs, hard disk drives, magnetic discs, magneto-optic discs, CD-ROMs, DVDs, ROM cartridges, RAM memory cartridges with battery backup, flash memory cartridges, and nonvolatile RAM cartridges. Further, examples of the communication medium include wired communication media such as telephone lines, wireless communication media such as microwave lines, and Internet.

Second Exemplary Embodiment of the Invention

A femto base station in accordance with this exemplary embodiment adjusts a radio resource by using a connection request frequency by an unregistered mobile station as an index as in the case of the above-described femto base station 1. However, the procedure for adjusting a radio resource is different in detail from that of the above-described femto base station 1. Note that the configuration of a femto base station in accordance with this exemplary embodiment may be similar to that of the femto base station 1 shown in FIG. 2. Therefore, duplicated explanation about the configuration of a femto base station in accordance with this exemplary embodiment is omitted. Further, when components of the femto base station in accordance with this exemplary embodiment are mentioned, the names and signs of the components of the femto base station 1 shown in FIG. 2 are used.

A femto base station in accordance with this exemplary embodiment uses, in addition to the connection request frequency F1 for each unregistered mobile station, the total frequency FT of connection requests by all the unregistered mobile stations as an index. The total frequency FT is the total number of times of connection requests that are performed by the unregistered mobile stations during a unit period of history summarizing, and equal to the total value of the above-described connection request frequencies F1 each for a respective one of the unregistered mobile stations.

The table shown in FIG. 6 shows determination conditions used for a radio resource adjustment by the radio network control unit 15 provided in a femto base station in accordance with this exemplary embodiment as well as details of a radio resource adjustment that is performed when the determination condition is satisfied.

When the connection request frequency F1 is smaller than a threshold Th1 and the total frequency FT is smaller than a threshold Th3, the femto base station in accordance with this exemplary embodiment maintains the maximum value Ptx_total_max of the total transmission power at P1 (when condition at upper left portion of FIG. 6 is satisfied). Further, when the maximum value Ptx_total_max of the total transmission power is in a lowered state, it performs a recovery process. Note that the threshold Th3 for the total frequency FT may be set to a larger value than the above-described threshold Th1. Note also that when the recovery process of Ptx_total_max is to be performed, the determination using the threshold Th2 explained in the first exemplary embodiment of the invention may be performed in addition to the above determination.

Further, when the connection request frequency F1 is equal to or larger than the threshold Th1 and the total frequency FT is smaller than the threshold Th3, the femto base station in accordance with this exemplary embodiment lowers the maximum value Ptx_total_max of the total transmission power to P2 (when condition at lower left portion of FIG. 6 is satisfied). This process is equivalent to the above-described adjustment procedure of the femto base station 1.

Further, when the connection request frequency F1 is smaller than the threshold Th1 and the total frequency FT is equal to or larger than the threshold Th3, the femto base station in accordance with this exemplary embodiment also lowers the maximum value Ptx_total_max of the total transmission power to P2 (when condition at upper right portion of FIG. 6 is satisfied).

Furthermore, when the connection request frequency F1 is equal to or larger than the threshold Th1 and the total frequency FT is also equal to or larger than the threshold Th3, the femto base station in accordance with this exemplary embodiment changes the used frequency band (when condition at lower right portion of FIG. 6 is satisfied).

As described above, by using the total frequency FT as well as the connection request frequency F1 for each unregistered mobile station as an index used to adjust the radio resource, the degree of interference with a transmission/reception signal of the unregistered mobile station can be evaluated in a more detailed manner. That is, when both of the connection request frequency F1 for each unregistered mobile station and the total frequency FT are large, it indicates that the degree of interference with a transmission/reception signal of the unregistered mobile station is more serious. Therefore, when both of the connection request frequency F1 and the total frequency FT are large, the femto base station in accordance with this exemplary embodiment performs a radio resource adjustment that enables the interference to be avoided more reliably in comparison when only one of the connection request frequency F1 and the total frequency FT is large.

Note that the adjustment method shown in FIG. 6 in which the used frequency band is changed when both of the connection request frequency F1 and the total frequency FT are large is merely an example. For example, when both of the connection request frequency F1 and the total frequency FT are large, the femto base station in accordance with this exemplary embodiment may lower the maximum value Ptx_total_max of the total transmission power more widely in comparison to when only one of the connection request frequency F1 and the total frequency FT is large. The adjustment method like this can also avoid the interference more reliably.

Third Exemplary Embodiment of the Invention

A configuration of a femto base station in accordance with first and second exemplary embodiments of the invention shown in FIG. 2 is merely an example. For example, the connection request history storage unit 19 may be implemented as a memory device, such as a memory card, that can be attached to and detached from the femto base station 1. Further, the connection request history storage unit 19 may be stored in an external storage device to which the femto base station 1 can access, or may be held in a device provided within the network 5.

Further, the femto base station 1 does not necessarily have to include the connection control unit 18. For example, the function of the connection control unit 18 is disposed within the network 5. In this case, the femto base station 1 may transfer a connection request received from a mobile station to the upper network 5, and receive an authentication result of the mobile station from the network 5. Further, the femto base station 1 does not necessarily have to include the RNC function, and the RNC function may be disposed within the network 5.

Figure 7:
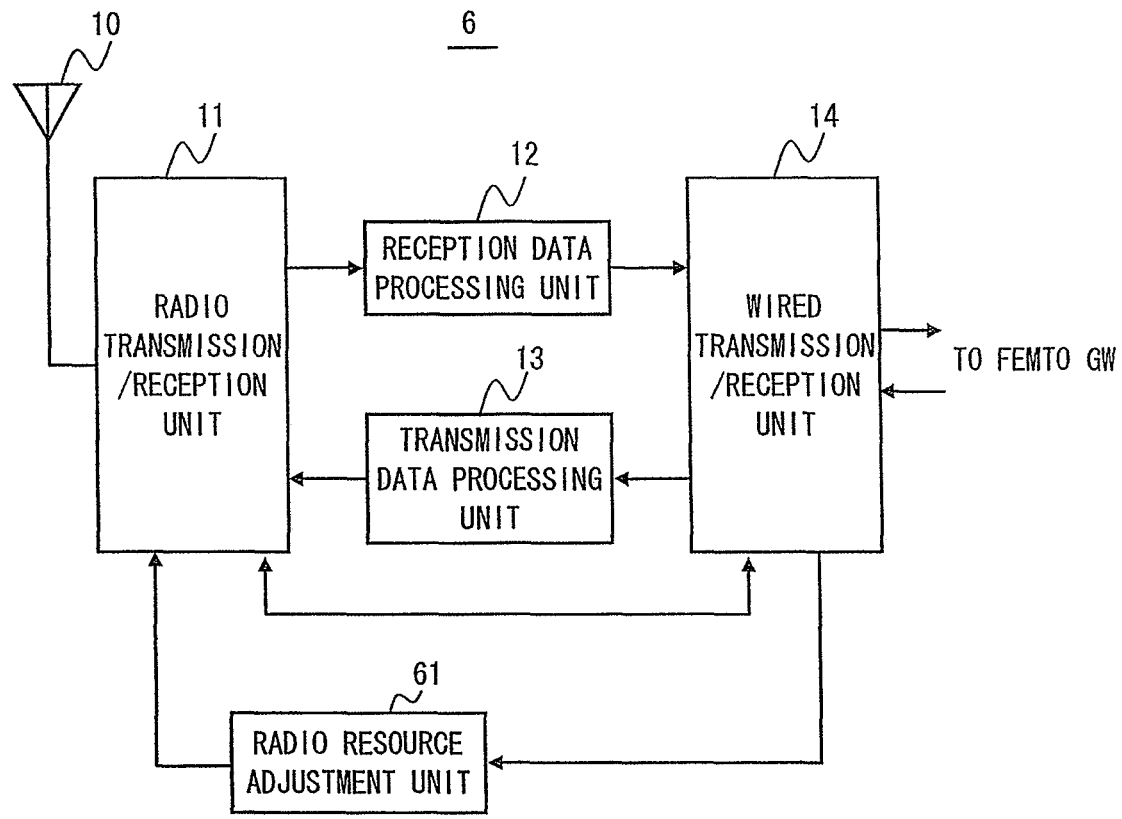
FIG. 7 is a block diagram of a femto base station in accordance with a third exemplary embodiment of the present invention.
Figure 8:
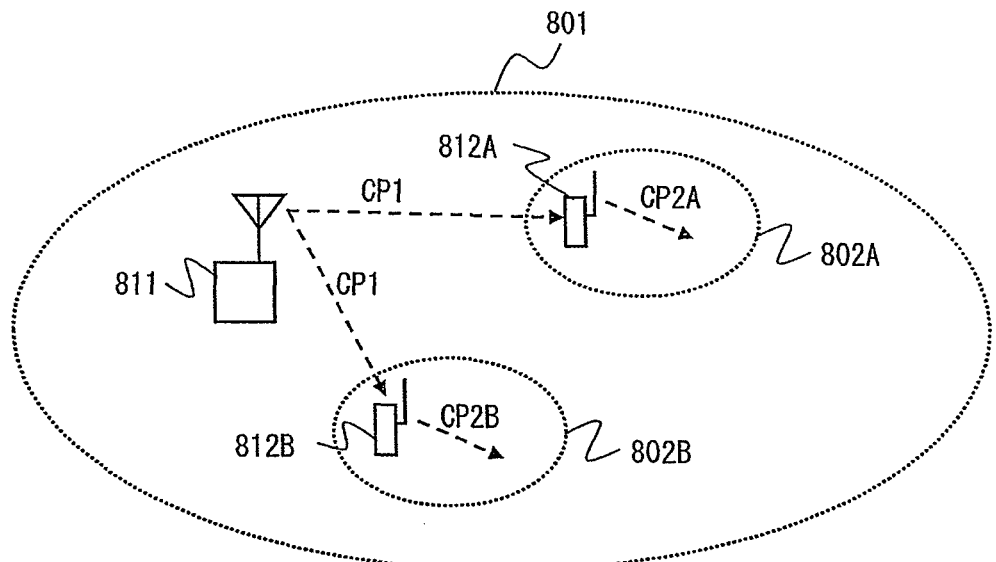
FIG. 8 is a configuration diagram of a radio communication system for explaining background art.

FIG. 7 is a block diagram of a femto base station 6 in accordance with this exemplary embodiment. The femto base station 6 receives a notification of radio parameters such as a used frequency to be applied to the radio transmission/reception unit 11 and a transmission power of a common pilot signal from an RNC disposed on the upper network 5. Further, the network 5 transfers a connection request received from a mobile station to the upper network 5, and receives an authentication result of the mobile station from the network 5.

In FIG. 7, a radio resource adjustment unit 61 adjusts a radio resource by using a connection request frequency by an unregistered mobile station as an index. Specifically, the radio resource adjustment unit 61 may adjust a maximum value Ptx_total_max of the total transmission power in accordance with the procedures of the flowcharts shown in FIGS. 3 and 4. Note that the radio resource adjustment unit 61 may refer to a connection request history stored within the upper network 5. In such a case, the step S11 in FIG. 3 is omitted.

Note also that the determination whether a radio resource adjustment using a connection request frequency is necessary or not may be performed by a apparatus disposed on the upper network 5, e.g., an RNC. In such a case, the radio resource adjustment unit 61 may receive a radio resource adjustment instruction from the network 5, and perform a radio resource adjustment according to the adjustment instruction. That is, the task of the permission/refusal determination of connection to the femto base station 6 by a mobile station, the task of the storage of a connection request history, and the task of the necessary/unnecessary determination of a radio resource using a connection request history can be arbitrarily shared between the femto base station 6 and the upper network 5 to which the femto base station 6 is connected.

According to the femto base station 6 in accordance with this exemplary embodiment, it is also possible to effectively suppress the occurrence of interference between a signal transmitted/received between an unregistered mobile station and another radio station (e.g., another femto base station or a macro base station forming an upper macrocell) and a transmission/reception signal of the femto base station 6 itself as in the case of the above-described femto base station 1.

Other Exemplary Embodiments

Examples in which connection to the femto base station 1 or 6 is permitted depending on whether the transmission source of the connection request is "registered mobile station" or not are explained in the above-described first to third exemplary embodiments of the invention. However, the femto base stations 1 and 6 may permit connection to the femto base stations 1 and 6 even when a mobile station at the transmission source of the connection request is "unregistered mobile station". In such a case, the connection control unit 18 may have a restriction such that unregistered mobile stations are permitted to connect unless the number of connected unregistered mobile stations does not exceed a predetermined upper limit. In this case, when a connection request arrives in a state where the number of connected unregistered mobile stations has already reached the upper limit, the connection control unit 18 may refuse that connection request and store a history indicating the fact that the connection request is refused in the connection request history storage unit 19. Further, in this case, the radio network control unit 15 may determine whether a radio resource adjustment is necessary or not based on the occurrence history of connection request refusal.

As another example, the connection control unit 18 may impose communication regulation such as restricting the content of communication of an unregistered mobile station in comparison to that of a registered mobile station. An example of a restriction on communication contents is to limit the communication speed of an unregistered mobile station to a lower speed in comparison to that of a registered mobile station. In such a case, the connection control unit 18 may store a reception history of a connection request from an unregistered mobile station on which the communication regulation is imposed to the connection request history storage unit 19. Further, in this case, the radio network control unit 15 may determine whether a radio resource adjustment is necessary or not based on the reception history of the connection request from the unregistered mobile station on which the communication regulation is imposed.

In the above-described first to third exemplary embodiments of the invention, cases where the present invention is applied to a radio communication system adopting a W-CDMA mode are explained. However, there is no particular restriction on the radio communication mode to which the present invention is applied. For example, the present invention can be also applied to radio communication systems adopting a TDD (Time Division Duplex) mode in which the same radio frequency is used in both the uplink and downlink in a time-division manner. Further, for example, the present invention can be also applied to radio communication systems adopting an E-UTRAN mode instead of the W-CDMA mode. In this case, the radio resource block PRB may be changed instead of changing the above-described used frequency band.

Further, in the above-described first to third exemplary embodiments of the invention, cases where the present invention is applied to a femto base station are explained. However, the present invention can be also applied, for example, to each of a plurality of radio stations that autonomously form a radio ad-hoc network.

Further, the present invention is not limited to the above-described exemplary embodiments, and needless to say, various modifications can be made within the limits that do not depart from the spirit of the present invention described above.

This application is based upon and claims the benefit of priority from Japanese patent application No. 2008-080741, filed on Mar. 26, 2008, the disclosure of which is incorporated herein in its entirety by reference.

INDUSTRIAL APPLICABILITY

The present invention can be used in radio resource control techniques used in communication between radio stations.

The invention claimed is:
1. A radio resource control method comprising:
   a step (a) of recording a history of a connection request issued from a plurality of second radio stations to a first radio station;
   a second step (b) of determining execution of an adjustment of a radio resource used in communication between at least one of the plurality of second radio stations and the first radio station by using connection request frequencies each for one of unregistered radio stations as an index, the unregistered radio stations being radio stations that are not pre-registered in the first radio station among the plurality of second radio stations, wherein
   each of the unregistered radio stations is a radio station whose connection to the first radio station is refused, a radio station whose connection to the first radio station is permitted unless a number of connected radio stations does not exceed a predetermined upper limit, or a radio station whose content of communication with the first radio station is restricted in comparison to that of a registered radio station that is pre-registered in the first radio station among the plurality of second radio stations.

2. The radio resource control method according to claim 1, wherein in the step (b), the first radio station determines to execute the radio resource adjustment when at least one of the connection request frequencies each for one of unregistered radio stations exceeds a first threshold.

3. The radio resource control method according to claim 1, wherein the radio resource adjustment comprises changing the radio resource used in communication between said at least one of the plurality of second radio stations and the first radio station such that interference with an external radio signal transmitted/received between the unregistered radio station and another radio station is suppressed.

4. The radio resource control method according to claim 3, wherein the radio resource adjustment comprises at least one of lowering a maximum value of downlink transmission power that the first radio station transmits to said at least one of the plurality of second radio stations, and changing a used frequency band between the first radio station and said at least one of the plurality of second radio stations.

5. The radio resource control method according to claim 4, further comprising:
  a step (c) of lowering the maximum value of the downlink transmission power as the radio resource adjustment; and
  a step (d) of, after the maximum value of the downlink transmission power is lowered, gradually increasing the maximum value of the downlink transmission power when a newly obtained connection request frequency for a certain unregistered radio station whose connection request frequency has previously exceeded the first threshold is lower than a second threshold that is set so as to be equal to or lower than the first threshold.

6. The radio resource control method according to claim 4, wherein in the step (b),
  the first radio station further obtains a total frequency of connection requests by all of a plurality of unregistered radio stations, and
  when both a first condition that at least one of the connection request frequencies each for one of the unregistered radio stations exceeds the first threshold and a second condition that the total frequency exceeds a third threshold are satisfied, execution of a radio resource adjustment to change the radio resource is determined such that interference with the external radio signal is suppressed even further in comparison to when only one of the first and second conditions is satisfied.

7. The radio resource control method according to claim 6, wherein when only one of the first and second conditions is satisfied, the first radio station determines to lower a maximum value of the downlink transmission power, whereas when both of the first and second conditions are satisfied, the first radio station determines to change the used frequency band.

8. The radio resource control method according to claim 6, wherein when both of the first and second conditions are satisfied, the first radio station determines to lower a maximum value of the downlink transmission power more widely in comparison to when only one of the first and second conditions is satisfied.

9. A radio station apparatus comprising:
  a radio transmission/reception unit; and
  a radio resource adjustment unit configured to adjust, bases on a history of a connection request issued by a plurality of opposed radio stations, a radio resource used in communication with at least one of the plurality of opposed radio stations through the radio transmission/reception unit by using connection request frequencies each for one of unregistered radio stations as an index, the unregistered radio stations being radio stations that are not pre-registered among the plurality of opposed radio stations, wherein
  each of the unregistered radio stations is a radio station whose connection to the first radio station is refused, a radio station whose connection to the first radio station is permitted unless a number of connected radio stations does not exceed a predetermined upper limit, or a radio station whose content of communication with the first radio station is restricted in comparison to that of a registered radio station that is pre-registered in the first radio station among the plurality of second radio stations.

10. The radio station apparatus according to claim 9, wherein the radio resource adjustment unit adjusts the radio resource when at least one of the connection request frequencies each for one of unregistered radio stations exceeds a first threshold.

11. The radio station apparatus according to claim 9, wherein the radio resource adjustment comprises changing the radio resource used in communication between said at least one of the plurality of opposed radio stations and the first radio station such that interference with an external radio signal transmitted/received between the unregistered radio station and another radio station is suppressed.

12. The radio station apparatus according to claim 11, wherein the radio resource adjustment comprises at least one of lowering a maximum value of downlink transmission power that is transmitted from the radio transmission/reception unit to said at least one of the plurality of opposed radio stations, and changing a used frequency band between the radio transmission/reception unit and said at least one of the plurality of opposed radio stations.

13. The radio station apparatus according to claim 12, wherein the radio resource adjustment unit:
  lowers the maximum value of the downlink transmission power when at least one of the connection request frequencies each for one of unregistered radio stations exceeds the first threshold; and
  after the maximum value of the downlink transmission power is lowered, gradually increases the maximum value of the downlink transmission power when a newly obtained connection request frequency for a certain unregistered radio station whose connection request frequency has previously exceeded the first threshold is lower than a second threshold that is set so as to be equal to or lower than the first threshold.

14. The radio station apparatus according to claim 12, wherein the radio resource adjustment unit:
  obtains a total frequency of connection requests by all of a plurality of unregistered radio stations, and
  adjusts, when both a first condition that at least one of the connection request frequencies each for one of the unregistered radio stations exceeds the first threshold and a second condition that the total frequency exceeds a third threshold are satisfied, the radio resource interference with the external radio signal is suppressed even further in comparison to when only one of the first and second conditions is satisfied.

15. The radio station apparatus according to claim 14, wherein the radio resource adjustment unit lowers a maximum value of the downlink transmission power when only one of the first and second conditions is satisfied, and changes the used frequency band when both of the first and second conditions are satisfied.

16. The radio station apparatus according to claim 14, wherein when both of the first and second conditions are satisfied, the radio resource adjustment unit lowers a maximum value of the downlink transmission power more widely in comparison to when only one of the first and second conditions is satisfied.

17. The radio station apparatus according to claim 9, further comprising connection control unit configured to determine permission/refusal of connection by the opposed radio station when the connection request is received through the radio transmission/reception unit.

18. The radio station apparatus according to claim 9, wherein the unregistered radio station is a radio station whose connection to the radio station apparatus is refused, a radio station whose connection to the radio station apparatus is permitted unless a number of connected radio stations does not exceed a predetermined upper limit, or a radio station whose content of communication with the radio station apparatus is restricted in comparison to that of the registered radio station.

19. A non-transitory recording medium storing a radio station control program to cause a computer to execute control processing relating to a radio station apparatus, the control processing comprising:
- a process (a) of recording a history of a connection request issued from a plurality of opposed radio stations to the radio station apparatus, and
- a process (b) of determining execution of an adjustment of a radio resource used in communication between at least one of the plurality of opposed radio stations and the radio station apparatus by using connection request frequencies each for one of unregistered radio stations as an index, the unregistered radio stations being radio stations that are not pre-registered in the radio station apparatus among the plurality of opposed radio stations, wherein
- each of the unregistered radio stations is a radio station whose connection to the first radio station is refused, a radio station whose connection to the first radio station is permitted unless a number of connected radio stations does not exceed a predetermined upper limit, or a radio station whose content of communication with the first radio station is restricted in comparison to that of a registered radio station that is pre-registered in the first radio station among the plurality of second radio stations.

20. The recording medium storing a radio station control program according to claim 19, wherein in the process (b), when at least one of the connection request frequencies each for one of unregistered radio stations exceeds a first threshold, execution of the radio resource adjustment is determined.

21. The recording medium storing a radio station control program according to claim 19, wherein the radio resource adjustment comprises changing the radio resource used in communication between said at least one of the plurality of opposed radio stations and the first radio station such that interference with an external radio signal transmitted/received between the unregistered radio station and another radio station is suppressed.

22. The recording medium storing a radio station control program according to claim 21, wherein the radio resource adjustment comprises at least one of lowering a maximum value of downlink transmission power that the radio station apparatus transmits to said at least one of the plurality of opposed radio stations, and changing a used frequency band between the radio station apparatus and said at least one of the plurality of opposed radio stations.

23. The recording medium storing a radio station control program according to claim 22, wherein the control processing further comprising:
- a process (c) of instructing to lower the maximum value of the downlink transmission power as the radio resource adjustment; and
- a process (d) of, after the maximum value of the downlink transmission power is lowered, instructing to gradually increase the maximum value of the downlink transmission power when a newly obtained connection request frequency for a certain unregistered radio station whose connection request frequency has previously exceeded the first threshold is lower than a second threshold that is set so as to be equal to or lower than the first threshold.

24. The recording medium storing a radio station control program according to claim 22, wherein
the process (b) further comprises a process of obtaining a total frequency of connection requests by all of a plurality of unregistered radio stations, and
when both a first condition that at least one of the connection request frequencies each for one of the unregistered radio stations exceeds the first threshold and a second condition that the total frequency exceeds a third threshold are satisfied, execution of a radio resource adjustment to change the radio resource is determined interference with the external radio signal is suppressed even further in comparison to when only one of the first and second conditions is satisfied.

25. The recording medium storing a radio station control program according to claim 24, wherein in the process (b), when only one of the first and second conditions is satisfied, the maximum value of the downlink transmission power is determined to be lowered, whereas when both of the first and second conditions are satisfied, the used frequency band is determined to be changed.

26. The recording medium storing a radio station control program according to claim 24, wherein when both of the first and second conditions are satisfied, the maximum value of the downlink transmission power is determined to be lowered more widely in comparison to when only one of the first and second conditions is satisfied.

27. A radio communication system comprising:
- a first radio station comprising radio transmission/reception unit capable of transmitting/receiving a radio signal;
- a connection control unit configured to determine permission/refusal of connection to the first radio station by an opposed radio station based on whether the opposed radio station is a registered radio station that is pre-registered in the first radio station or an unregistered radio station that is not pre-registered when the first radio station receives a connection request from the opposed radio station through the radio transmission/reception unit;
- a radio resource adjustment unit configured to adjust, based on a history of a connection request issued by a plurality of opposed radio stations, a radio resource used in communication with at least one of the plurality of opposed radio stations through the radio transmission/reception unit by using connection request frequencies each for one of the unregistered radio stations as an index, wherein
- each of the unregistered radio stations is a radio station whose connection to the first radio station is refused, a radio station whose connection to the first radio station is permitted unless a number of connected radio stations does not exceed a predetermined upper limit, or a radio station whose content of communication with the first radio station is restricted in comparison to that of a registered radio station that is pre-registered in the first radio station among the plurality of second radio stations.

28. A radio communication system comprising a first radio station and a second radio station, wherein the first radio station comprises:
- a radio transmission/reception unit; and
- a radio resource adjustment unit configured to adjust, bases on a history of a connection request arrived from the plurality of second radio stations to the radio transmission/reception unit, a radio resource used in communication between at least one of the plurality of second radio stations and the radio transmission/reception unit by using connection request frequencies each for one of unregistered radio stations as an index, the unregistered radio stations being radio stations that are not pre-registered among the plurality of second radio stations, wherein each of the unregistered radio stations is a radio station whose connection to the first radio station is refused, a radio station whose connection to the first radio station is permitted unless a number of connected radio stations does not exceed a predetermined upper limit, or a radio station whose content of communication with the first radio station is restricted in comparison to that of a registered radio station that is pre-registered in the first radio station among the plurality of second radio stations.

29. The radio communication system according to claim 28, wherein the second radio station is configured such that when connection to the first radio station is restricted, the second radio station does not perform transmission of a new connection request to the first radio station for a predetermined prohibition period, and a period over which the first radio station summarizes the history to obtain the connection request frequency is set so as to be longer than the prohibition period.

\* \* \* \* \*